Feb. 27, 1962 J. N. LONG 3,022,642
REFRIGERATION COMPRESSOR CONTROL SYSTEM
Filed Oct. 7, 1960 3 Sheets-Sheet 1

INVENTOR.
JOSEPH N. LONG
BY Lieber, Lieber & Nilles
Attorneys

INVENTOR.
JOSEPH N. LONG

United States Patent Office 3,022,642
Patented Feb. 27, 1962

3,022,642
REFRIGERATION COMPRESSOR CONTROL SYSTEM
Joseph N. Long, Wauwatosa, Wis., assignor to Vilter Manufacturing Corporation, Milwaukee, Wis., a corporation of Wisconsin
Filed Oct. 7, 1960, Ser. No. 61,133
4 Claims. (Cl. 62—196)

This invention relates in general to refrigeration systems and finds particular, though not exclusive, utility in systems of the type employing a plurality of compressors. More specifically the invention relates to a compressor control mechanism and system which are responsive to the saturated suction temperature of the refrigerant. The invention finds particular utility in low temperature systems and those low temperature systems using ammonia for the refrigerant.

Conventional compressor refrigeration systems have a multiplicity of control steps, whether a single large compressor is used, or a number of compressors each having a series of control steps is employed. For example, one system using three compressors each having four steps of capacity to give a total of twelve steps may be used and a pressure switch is ordinarily used for each capacity step, each switch having a minimum range of five pounds differential. Thus, assuming a one pound overlap between switches, the entire control range from no-load to full-load capacity would be 17 pounds.

These pressure-type controls, particularly when used on low temperature systems, have too wide a differential to give accurate and sensitive compressor capacity control.

In a refrigerant such as ammonia, a known and definite relationship exists between temperature and pressure at saturated conditions. When in a general neighborhood of 24 to 25 inches of ammonia, a difference of one pound in pressure results in a temperature difference of about 10 degrees F. and, as the pressure rises, the temperature differential for any increment of pressure rise, decreases. On the other hand, the refrigerant temperature has a uniform scale range making it a better criterion at all temperatures for controlling purposes.

In accordance with the present invention a refrigeration compressor control system is provided in which the saturated suction temperature of the refrigerant is sensed to control the compressors. As a result a controller is provided for multiple compressors which can more accurately control the compressors and thereby maintain a stable operating condition.

The invention provides a sensing mechanism for controlling refrigeration compressors, which mechanism will sense only the saturated suction temperature of the refrigerant. One modification of the invention contemplates that this mechanism has external heat supplying means for insuring the refrigerant is at a saturated condition when its temperature is measured. Another modification, employing a liquid recirculating system, does not require this external heat because the liquid, at the point in the system where it is measured, is always at saturated conditions.

These and other objects and advantages will appear hereinafter as this disclosure progresses, reference being had to the accompanying drawings in which.

Figure 1:
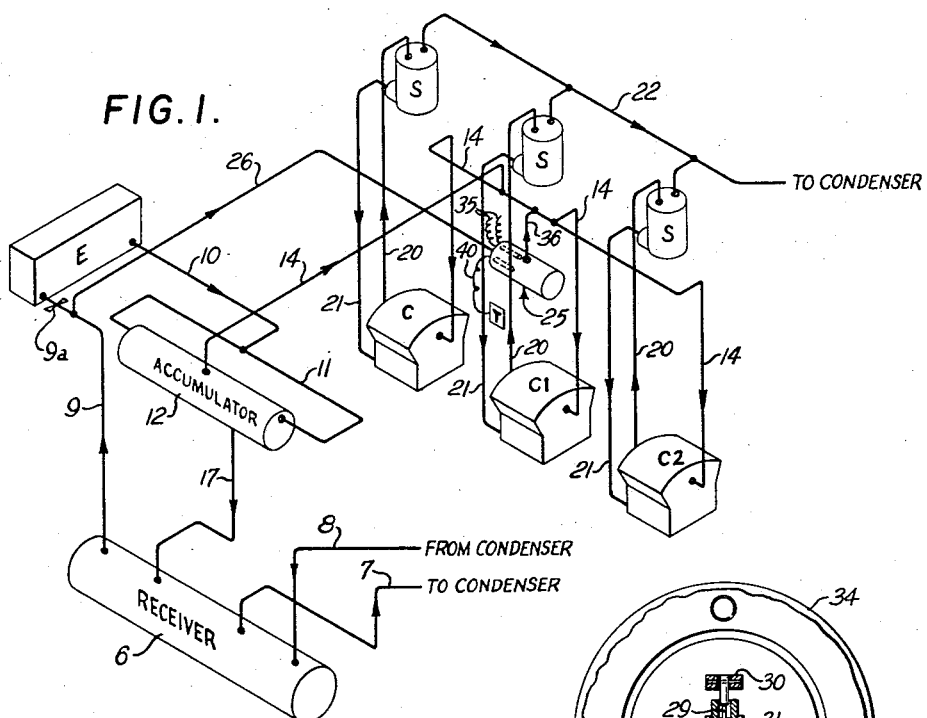
FIGURE 1 is a schematic diagram of a multiple compressor refrigeration system utilizing the present invention, certain parts being omitted for the sake of clarity.

In the schematic refrigeration system shown in FIGURE 1, certain conventional parts have been omitted for the sake of clarity, such as, inter alia, various valves, traps, diffusers and gauges. The system includes a liquid receiver 6 having conduits 7 and 8, respectively, leading to and returning from the condenser (not shown). Liquid refrigerant passes under pressure through conduit 9 to the expansion valve 9a located immediately ahead of the evaporator E. As the liquid passes through the expansion valve and expands into the evaporator it passes from the pressure or high side of the system to the low side. A suction conduit 10, and its associated distributing conduit 11, convey the refrigerant from the evaporator to the accumulator 12. The vaporized refrigerant delivered to the accumulator from the evaporator may be mixed with some liquid refrigerant and the accumulator acts to separate the liquid from the vaporized refrigerant before the latter is sucked into the compressors C, C1 and C2 via lines 14. Liquid refrigerant in the accumulator is returned to the receiver 6 via line 17.

The compressors, C, C1 and C2 deliver a mixture of oil and vaporized refrigerant to the oil separators S via their respective conduits 20. The oil is returned to the compressors from the separators by means of oil return conduits 21.

Vaporized refrigerant is then transmitted from the separators to the condenser (not shown) through the conduit 22.

In accordance with the present invention a compressor control mechanism 25 is provided, which mechanism taps off liquid refrigerant from conduit 9 by means of conduit 26 and feeds it into the mechanism 25. Thus a liquid refrigerant is supplied to valve 29 of the mechanism at substantially compressor discharge pressures.

With the above arrangement, high pressure liquid refrigerant is tapped off from line 9 but before this liquid is admitted to a housing 27 of mechanism 25, it is passed through the reducing valve 29. Therefore, within the mechanism 25 there exists a low pressure condition which gives a saturated condition located at the low pressure side of the system. The tap off for the high pressure liquid refrigerant must be located at the high pressure side of the system in order to get the refrigerant in liquid form, as will more fully appear.

Mechanism 25 includes a housing 27 having a spring counter-balanced float 28 which actuates a valve needle 29 through an arm 30 pivoted at 32. The action is such that as the level of the liquid refrigerant R rises the float will also rise to move the needle 29 downwardly toward its seat 31 to thereby close the valve when a predetermined level is reached and prevent further flow of liquid into the housing. Conversely, when the level drops the float will lower and cause the valve to open and admit liquid to the housing. As the liquid passes the valve 29 it expands and passes from the high side of the system to the low side. A certain liquid refrigerant level is thereby maintained in the mechanism so that the temperature measuring means, to be described, will remain submerged.

As is well known in this art, a saturated refrigerant condition is the boiling point temperature of the refrigerant for a given pressure condition. Any heat that is picked up by the refrigerant above this saturated condition is called super heat.

In accordance with the present invention, because of the fact that a saturated condition has a definite relationship to the pressure of the refrigerant and rather than sense the temperature of the vapor (which would give a false indication because of super heat which may be present), a sensing means is maintained in a saturated condition.

As indicated, at a given pressure, saturated vapor is at the same temperature as its boiling liquid, and means may be included in mechanism 25 for keeping the liquid refrigerant at the boiling point so as to insure the latter remains in a saturated condition. This means comprises a tubular well 33 that is threadably and sealingly engaged in the cover 34 of the housing and extends into the liquid refrigerant. The inner end of the well is closed and its outer end is open to receive the electric heater 35. The heater is connected to a source of electrical power (not shown) which is sufficient to keep the liquid at the boiling point.

Means, such as heater 33, may not be necessary in the present invention because enough additional heat may be picked up from the machine being controlled to keep the refrigerant at the saturated condition.

Vaporized refrigerant in the mechanism 25 is conducted out through conduit 36 and into the suction line 14 of the compressor, thus insuring that the pressure in the mechanism does not rise and thereby only the temperature of saturated refrigerant is measured. The housing 27 is kept in open communication with the suction line so that the same pressure exists in the housing as exists in the suction line. The liquid refrigerant is kept at the boiling point which in fact is a saturated condition of the liquid. The saturated condition of the vapor is the same as the saturated condition (temperature) of the liquid. Applicant thus maintains the same pressure in the housing 27 as exists in the suction line and removes vapors from the housing to prevent pressure build-up and consequent temperature rise.

Another well 38 is sealingly secured through cover 34 and has a closed end extending into the refrigerant R. A conventional thermo-bulb 39 is inserted within well 38 and its flexible tube 40 extends therefrom for actuating a thermostat T. Thus the bulb and the well are submerged and the bulb reflects the temperature of the liquid and cannot be affected by super-heated vapors.

Figure 4:
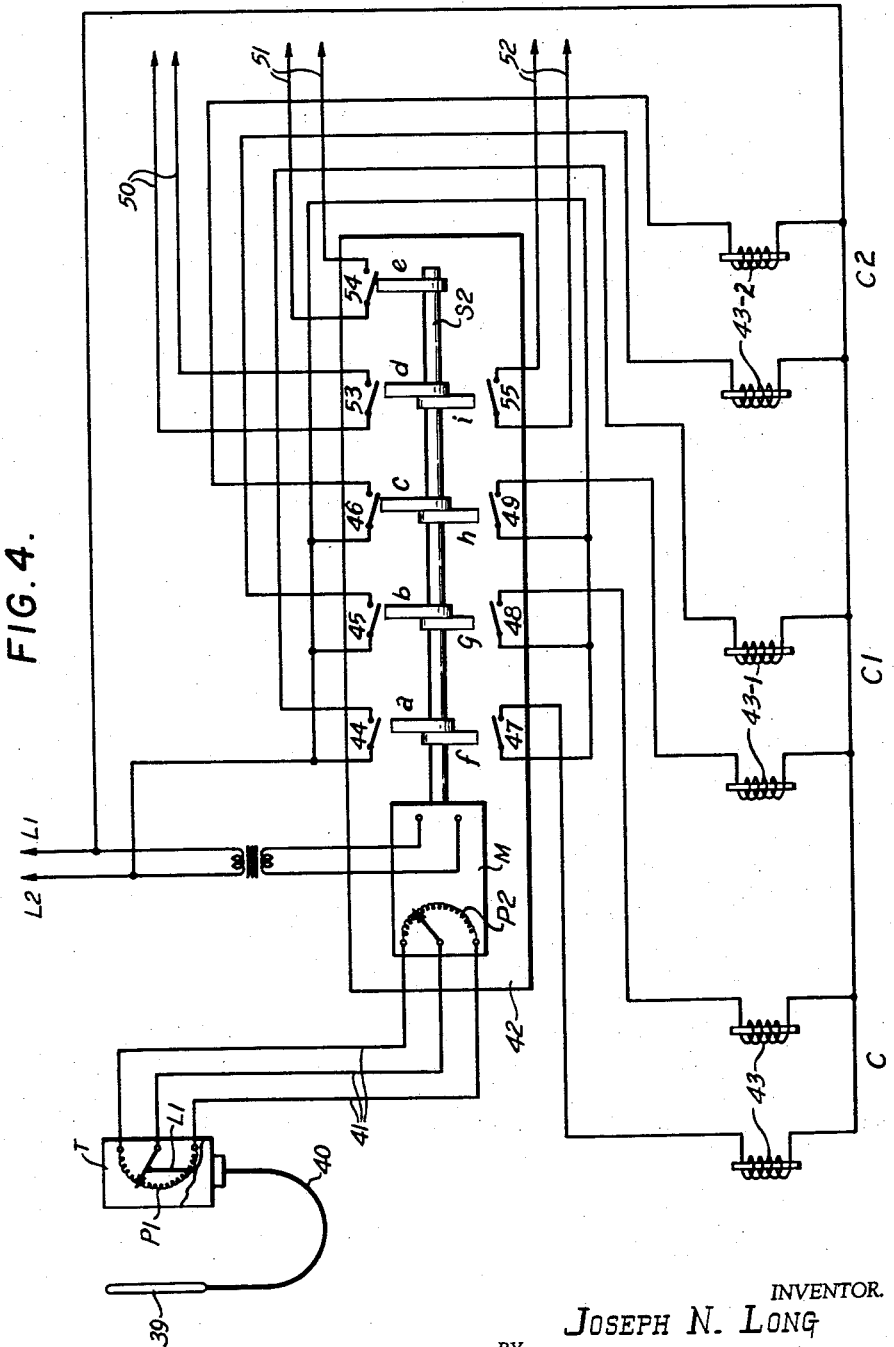
FIGURE 4 is an electrical diagram showing the connection between the thermostat, stepcontroller and compressors.

As shown in FIG. 4, the thermostat is electrically connected by wires 41 to the motor M of a conventional stepcontroller 42 which is in turn electrically connected to the compressors and acts to start and stop the compressors or change the capacity of all three of the compressors while they are operating. Each of the compressors C, C1 and C2 has a pair of solenoids 43, 43–1 and 43–2, respectively, actuated by their respective mercury-type switches 44—49 for regulating the capacity of the compressors while the latter are operating, thereby giving each compressor two steps of unloading. The operation of the solenoids and their function are well known and it is believed sufficient to say that the solenoids act to actuate a valve in the pilot line of the compressor loading mechanism. Of course any number of solenoids may be used to give a corresponding number of unloading steps, in the known manner.

Pairs of wires 50, 51 and 52 connect the mercury-type switches 53, 54 and 55, respectively, to their respective compressor motors (not shown) for starting and stopping the compressors, as follows.

The thermostat T is of the modulating potentiometer type and may be of the type manufactured by Minneapolis-Honeywell Company. It is conventional and well known and it is believed sufficient to say that temperature changes at the remote bulb cause pressure changes inside the bulb. The capillary tube 40 transmits the pressure from the bulb to a bellows (not shown) in the thermostat. The thermostat has a potentiometer P1, the slider of which is actuated by the linkage L1 which in turn is responsive to the bellows action.

The motor M of the stepcontroller is also conventional and well known and may be a modutrol motor as manufactured by Minneapolis-Honeywell Company. This electric motor M also has a potentiometer P2 which is connected by the wires 41 with the potentiometer of the thermostat. Thus a conventional potentiometer bridge circuit is established between the thermostat and motor M and any unbalance of the thermostat, caused by a rise or fall of temperature, correspondingly causes the motor to follow and bring the circuit back into balance. The motor M is of the reversible type and acts to drive its connected shaft S2 in one direction of rotation or another. Thereby any rise in the temperature at the thermobulb 39 unbalances the circuit in the thermostat T and this unbalancing causes the motor M to rotate to bring the unbalanced circuit back into equilibrium.

The stepcontroller shaft S2 has a series of cams $a$ through $i$ inclusive which are fixed on the shaft and rotatable therewith. These cams are set in a predetermined angular relationship with one another so that rotation of the shaft S2 causes the switches to be actuated in a predetermined sequence, in the well known manner.

In the present arrangement, when the motor M starts to rotate from a no-load position, the switch 54 is first to close by means of its cam $e$. Closing of the switch 54 causes the motor (not shown) of the compressor C2 to be brought into the circuit, that is, the compressor C2 is started through the conventional automatic starter of the motor connected into the circuit by lines 51. At this time the compressor operates at partial capacity. Further rotation of the motor M and its shaft S2 next closes switch 46 by action of the cam $c$. Closing of the switch 46 energizes one of its associated solenoids 43–2, to further load the compressor C2. Further rotation of the motor M in the same direction causes closing of the switch 45 by its cam $b$ which thus energizes the other coil 43–2 and brings the compressor to its full capacity. Continued movement of the motor M in the same direction will similarly start the other compressors as follows. Closing switch 53 by cam $d$ starts the motor (not shown) of another compressor C1, and then closing switches 44 and 49 in sequence actuates solenoids 43–1 of the compressor C1. Further continued rotation of the shaft S2, if demanded by the thermobulb 39, similarly starts compressor C by closing switch 55 by cam $i$ and bringing compressor C into the circuit through the lines 52 which are connected to the automatic starter of the motor (not shown) of the compressor C in the well known manner; compressor C is then loaded in steps by closing of the switches 47 and 48 by their respective cams $f$ and $g$ to energize the respective solenioids 43 of compressor C.

Figure 3:
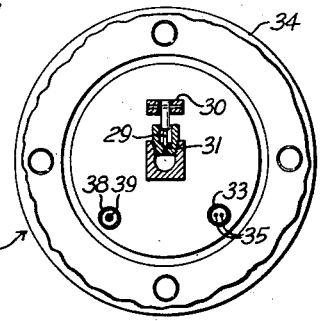
FIGURE 3 is a sectional view taken on line 3—3 of FIGURE 2.
Figure 2:
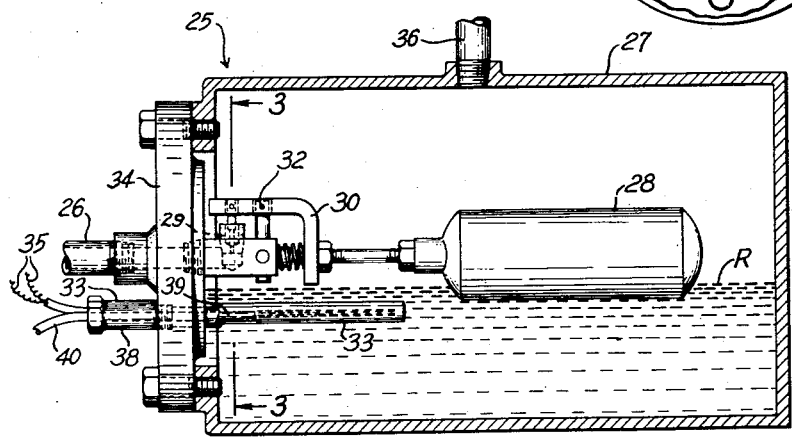
FIGURE 2 is an enlarged sectional view in elevation, of the sensing mechanism shown in FIGURE 1.
Figure 5:
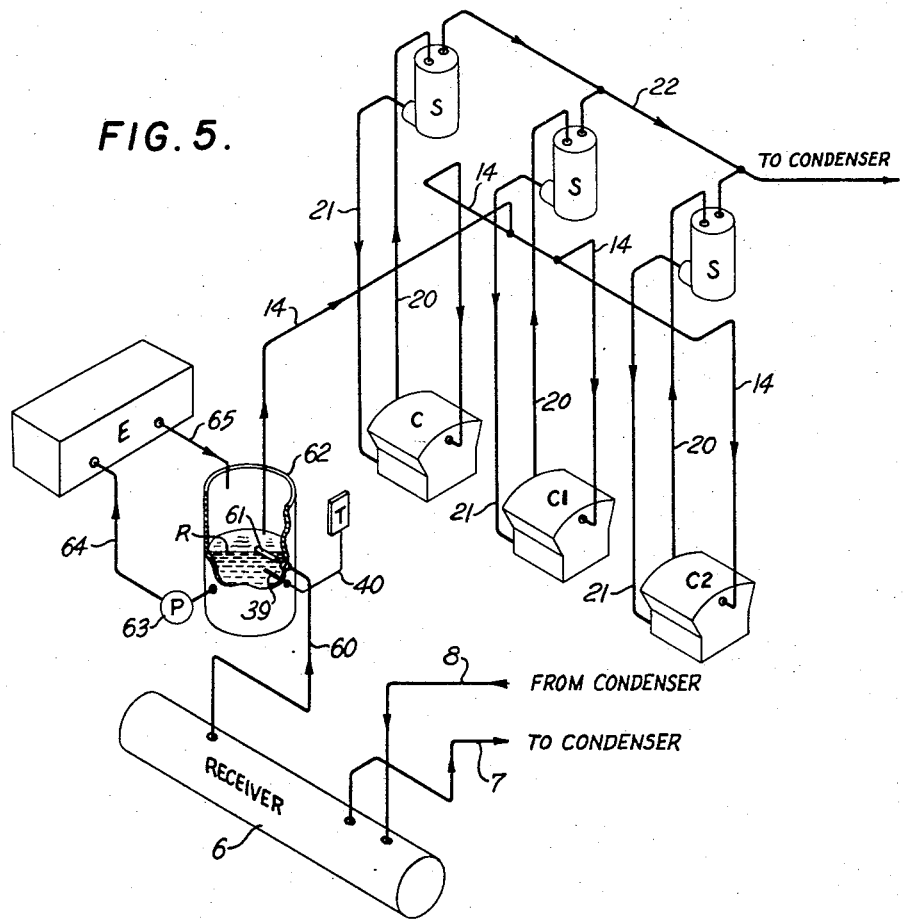
FIGURE 5 is a modification showing a schematic diagram of a liquid recirculating system utilizing the invention.

Instead of expanding directly into the evaporators as shown in the arrangement of FIGURES 1–3, the modification shown in FIGURE 5 illustrates a system of the liquid recirculating type wherein considerably more liquid refrigerant is pumped into the evaporators E than can possibly be evaporated, and therefore, a considerable amount of liquid is always returned to the accumulator with the vaporized refrigerant. With this arrangement, an external heat supplying means is not required in order to maintain the liquid at saturated conditions.

In FIGURE 5, parts similar to those in FIGURE 1 have been correspondingly identified. Liquid refrigerant is delivered from receiver 6 via conduit 60, float valve mechanism 61, and into the vertical accumulator 62. Valve mechanism 61 serves to maintain a predetermined liquid level in the accumulator in the conventional manner. The liquid level valve 61 is the dividing point in the system between the pressure and suction sides of the system. In other words, the liquid refrigerant is delivered to the valve mechanism 61 via line 60 under pressure from the compressor and as it expands in passing through the valve it enters the suction side of the system.

A pump 63 forces the liquid through conduit 64, and into evaporators E where some of the refrigerant is evaporated. The mixture of liquid and vaporized refrigerant is then pumped back into the accumulator 62 where the liquid R is separated from the vaporized refrigerant. Thus liquid refrigerant is fed to the evaporators in quantities greater than the evaporators can evaporate and therefore liquid comes back to the accumulator via line 65 along with some vapor. Vaporized refrigerant is than delivered via line 14 to the compressors, and from there on the operation is the same as in the arrangement shown in FIGURE 1.

With this type of system the liquid refrigerant in either the accumulator or in line 65 is always at saturated conditions and its temperature can be sensed in either of these places in accordance with this invention to control the compressors. The thermobulb 39 has been shown for illustrative purposes in FIGURE 5 as being inserted in the accumulator and submerged by the liquid refrigerant therein. The bulb could also be inserted in line 65 if desired.

The electrical circuit shown in FIGURE 4 would also be used with the arrangement of FIGURE 5.

The thermostat remote bulb 39 senses the saturated suction temperature of the refrigerant which gives more accurate control of the stepcontroller than would be possible by sensing suction pressure of the refrigerant. With either of the arrangements shown for measuring saturated suction temperature, than that merely placing a thermobulb anywhere in the suction line, any super heat picked up by the refrigerant will not influence the temperature readings.

The present invention provides means for using saturated suction temperatures of the refrigerant as the criterion to control a compressor or a multiplicity of compressors, which results in accuracy of control within 5 degrees and more stable conditions of operation.

This application is a continuation-in-part of United States Serial No. 722,017, filed March 17, 1958, which is abandoned.

Various modes of carrying out the invention are contemplated as being within the scope of the following claims particularly pointing out and distinctly claiming the subject matter which is regarded as the invention.

I claim:

1. In a refrigeration system having pressure and suction sides, a plurality of compressors each having capacity step controlling solenoids, a stepcontroller electrically connected with said solenoids, a source of saturated liquid refrigerant on the suction side of said system, means for maintaining a predetermined level of said source of refrigerant, and temperature responsive means located in and for measuring the temperature of said saturated refrigerant and electrically connected with said controller for changing the capacity of said compressors.

2. In a liquid recirculating refrigeration system having a plurality of compressors, said compressors having capacity controlling solenoids, a stepcontroller electrically connected with said solenoids for actuating the latter, an accumulator containing liquid refrigerant at saturated suction conditions, said compressors being in communication with said accumulator to draw vaporized refrigerant therefrom, and temperature responsive means located in and for measuring the saturated suction temperature of the liquid refrigerant and electrically connected to said controller for varying the capacity of said compressors in accordance with the temperature of said saturated refrigerant.

3. In a liquid recirculating refrigeration system having a plurality of compressors, said compressors having capacity controlling means, an accumulator containing liquid refrigerant at saturated suction conditions, liquid level maintaining means in said accumulator, said compressors being in communication with said accumulator to receive vaporized refrigerant therefrom, and temperature responsive means including a heat sensitive element in said refrigerant in said accumulator for measuring the saturated suction temperature of the liquid refrigerant and also including a thermostat electrically connected to said capacity controlling means for varying the capacity of said compressors in accordance with the temperature of said saturated refrigerant.

4. In a refrigeration system having a plurality of compressors each having capacity step controlling solenoids and also having pressure and suction sides, a step controller electrically connected with said solenoids, a source of saturated liquid refrigerant on the suction side of said system, means for maintaining a predetermined level of said source of refrigerant, and temperature responsive means including a thermobulb in said refrigerant for measuring the temperature of said saturated refrigerant, said temperature responsive means electrically connected with said step controller for controlling the capacity of said compressor.

References Cited in the file of this patent
UNITED STATES PATENTS

| | | |
|---|---|---|
| 2,112,791 | Small | Mar. 29, 1938 |
| 2,497,677 | Lathrop | Feb. 14, 1950 |